United States Patent
Huang

(10) Patent No.: US 10,271,262 B2
(45) Date of Patent: Apr. 23, 2019

(54) DEVICE-TO-DEVICE WIRELESS COMMUNICATION METHOD, DEVICE AND SYSTEM FOR DATA TRANSMISSION

(71) Applicant: INDUSTRIAL TECHNOLOGY RESEARCH INSTITUTE, Hsinchu (TW)

(72) Inventor: Kuei-Li Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 133 days.

(21) Appl. No.: 15/383,652

(22) Filed: Dec. 19, 2016

(65) Prior Publication Data

US 2018/0176849 A1 Jun. 21, 2018

(30) Foreign Application Priority Data

Dec. 16, 2016 (TW) .............................. 105141825 A

(51) Int. Cl.
*H04W 40/16* (2009.01)
*H04W 40/34* (2009.01)
(Continued)

(52) U.S. Cl.
CPC ........... *H04W 40/16* (2013.01); *H04W 40/34* (2013.01); *H04W 76/14* (2018.02); *H04W 76/19* (2018.02);
(Continued)

(58) Field of Classification Search
CPC ..... H04W 40/16; H04W 76/14; H04W 76/19; H04W 40/34; H04W 88/04; H04W 76/23;
(Continued)

(56) References Cited

U.S. PATENT DOCUMENTS

| 8,948,079 B2 | 2/2015 | Shin et al. |
| 9,277,439 B2 | 3/2016 | Pyattaev et al. |

(Continued)

FOREIGN PATENT DOCUMENTS

| CN | 105188020 A | 12/2015 |
| TW | 201624945 A | 7/2016 |
| WO | WO 2014/209794 A1 | 12/2014 |

OTHER PUBLICATIONS

3GPP, "Release 13," http://www.3gpp.org/release-13, 2015, pp. 1-2.
(Continued)

*Primary Examiner* — Michael Y Mapa
(74) *Attorney, Agent, or Firm* — Birch, Stewart, Kolasch & Birch, LLP

(57) ABSTRACT

Provided is a wireless communication method. At least an interfering link is selected from a plurality of wireless communication links. At least a first wireless communication helping device group of the at least interfering link is determined, wherein the at least first wireless communication helping device group includes at least a wireless communication helping device. Based on respective interfering improvements of the at least first wireless communication helping device group on the at least interfering link, at least a target interfering link is selected among the at least interfering link. The at least target interfering link is re-established.

24 Claims, 13 Drawing Sheets

(51) Int. Cl.
| | |
|---|---|
| *H04W 40/20* | (2009.01) |
| *H04W 88/04* | (2009.01) |
| *H04W 76/14* | (2018.01) |
| *H04W 76/19* | (2018.01) |
| *H04W 76/23* | (2018.01) |

(52) U.S. Cl.
CPC ............ *H04W 76/23* (2018.02); *H04W 40/20* (2013.01); *H04W 88/04* (2013.01); *Y02D 70/20* (2018.01); *Y02D 70/21* (2018.01); *Y02D 70/34* (2018.01)

(58) Field of Classification Search
CPC ....... H04W 40/20; Y02D 70/20; Y02D 70/34; Y02D 70/21
USPC ........ 455/63.1, 114.2, 278.1, 296, 428, 445; 370/317, 351
See application file for complete search history.

(56) References Cited

U.S. PATENT DOCUMENTS

| | | | |
|---|---|---|---|
| 9,445,422 | B2 | 9/2016 | Klang et al. |
| 2009/0075586 | A1* | 3/2009 | Li ........................ H04B 7/2606 455/7 |
| 2010/0166095 | A1* | 7/2010 | Lee ........................ H04L 1/0001 375/267 |
| 2012/0182907 | A1* | 7/2012 | Li ........................ H04W 76/14 370/280 |
| 2012/0189083 | A1* | 7/2012 | Reial .................... H04B 1/1027 375/340 |
| 2013/0089023 | A1 | 4/2013 | Shin et al. |
| 2013/0275563 | A1 | 10/2013 | Luna et al. |
| 2013/0336230 | A1 | 12/2013 | Zou et al. |
| 2015/0031284 | A1* | 1/2015 | Pitakdumrongkija ...................... H04W 16/26 455/9 |
| 2016/0156510 | A1 | 6/2016 | Li et al. |
| 2016/0295565 | A1* | 10/2016 | Kim ...................... H04W 76/14 |
| 2017/0318525 | A1* | 11/2017 | Cohen ............... H04W 52/0203 |

OTHER PUBLICATIONS

3rd Generation Partnership Project, "Technical Specification Group Radio Access Network; Evolved Universal Terrestrial Radio Access (E-UTRA) and Evolved Universal Terrestrial Radio Access Network (E-UTRAN) . . . ," 3GPP TS 36.300, V14.0.0, Release 1461T, Sep. 2016, pp. 1-314.

3rd Generation Partnership Project, "Technical Specification Group Services and System Aspects; Proximity-based Services (ProSe); Stage 2 (Release 13)," 3GPP TS 23.303, V13.3.0, Release 1335T, Mar. 2016, pp. 1-124.

3rd Generation Partnership Project, "Technical Specification Group Services and System Aspects; Study on Extended Architecture Support for Proximity-based Services (Release 13)," 3GPP TR 23.713, V13.0.0, Release 1339T, Sep. 2015, pp. 1-80.

3rd Generation Partnership Project, "Technical Specification Group Services and System Aspects; Telecommunication Management; Self-Organizing Networks (SON); Concepts and Requirements (Release 12)," 3GPP TS 32.500, V12.1.0, Release 1232T, Dec. 2014, pp. 1-13.

Chiu et al., "Empowering Device-to-Device Networks with Cross-Link Interference Management," IEEE Transactions on Mobile Computing, IEEE, 2016, pp. 1-14.

Hsu et al., "A Resource Allocation Perspective on Caching to Achieve Low Latency," IEEE Communications Letters, vol. 20, No. 1, Jan. 2016, pp. 145-148.

Huawei et al., "Sidelink Support & Enhancements for NR," 3GPP TSG RAN WG1 Meeting #86, R1-167207, Gothenburg, Sweden, Aug. 22-26, 2016, 7 pages.

Huawei et al., "Way Forward on Unified Duplex," 3GPP TSG RAN WG1 Meeting #86, R1-168059, Agenda Item 8.1.1, Gothenburg, Sweden, Aug. 22-26, 2016, 2 pages.

Jiang et al., "Maximized Cellular Traffic Offloading via Device-to-Device Content Sharing," IEEE Journal on Selected Areas in Communications, vol. 34, No. 1, Jan. 2016, pp. 82-91.

Li et al., "Applications of Interference Alignment in D2D Communications," ICTC, 2015, pp. 993-995.

Mach et al., "In-Band Device-to-Device Communication in OFDMA Cellular Networks: A Survey and Challenges," IEEE Communication Surveys & Tutorials, vol. 17, No. 4, Fourth Quarter 2015 (Date of publication Jun. 18, 2015), pp. 1885-1922.

Nohrborg, "Self-Organizing Networks," 3GPP, http://www.3gpp.org/technologies/keywords-acronyms/105-son, 2017, pp. 1-3.

Qualcomm Incorporated, "Sidelink Design for NR," 3GPP TSG RAN WG1 #86, R1-167310, Gothenburg, Sweden, Aug. 22-26, 2016, pp. 1-4.

Shen et al., "Device-to-Device-Assisted Communications in Cellular Networks: An Energy Efficient Approach in Downlink Video Sharing Scenario," IEEE Transactions on Wireless Communications, vol. 15, No. 2, Feb. 2016, pp. 1575-1587.

Shin et al., "Device-to-Device Communication Assisted Interference Mitigation for Next Generation Cellular Networks," 2013 IEEE International Conference on Consumer Electronics (ICCE), 2013, pp. 623-624.

Wang et al., "A Novel D2D Data Offloading Scheme for LTE Networks," IEEE ICC 2015—Mobile and Wireless Networking Symposium, IEEE, 2015, pp. 3107-3112.

Wang et al., "A Novel Interference Management Scheme in Underlay D2D Communication," IEEE, 2015, 5 pages.

Wang et al., "TASA: Traffic Offloading by Tag-Assisted Social-Aware Opportunistic Sharing in Mobile Social Networks," IEEE, 2015, 6 pages.

Yang et al., "Performance Analysis of Wireless Heterogeneous Networks with Pushing and Caching," IEEE ICC 2015—Wireless Communications Symposium, 2015, pp. 2190-2195.

\* cited by examiner

|        | D1→D2 | D2→D1 | D3→D4 | D4→D3 | D5→D6 | D6→D5 | D7→D8 | D8→D7 | D9→D10 | D10→D9 |
|--------|-------|-------|-------|-------|-------|-------|-------|-------|--------|--------|
| D1→D2  | NA    | ×     | ○     | ○     | ○     | ○     | ×     | ×     | ○      | ×      |
| D2→D1  | ×     | NA    | ×     | ×     | ×     | ×     | ×     | ×     | ×      | ×      |
| D3→D4  | ○     | ○     | NA    | ×     | ○     | ○     | ○     | ○     | ○      | ○      |
| D4→D3  | ○     | ○     | ×     | NA    | ○     | ○     | ○     | ○     | ○      | ○      |
| D5→D6  | ○     | ○     | ○     | ○     | NA    | ×     | ○     | ○     | ○      | ○      |
| D6→D5  | ×     | ○     | ○     | ○     | ×     | NA    | ○     | ○     | ○      | ○      |
| D7→D8  | ○     | ○     | ○     | ○     | ○     | ○     | NA    | ×     | ○      | ○      |
| D8→D7  | ○     | ○     | ○     | ○     | ○     | ○     | ×     | NA    | ○      | ○      |
| D9→D10 | ○     | ○     | ○     | ○     | ○     | ○     | ○     | ○     | NA     | ×      |
| D10→D9 | ○     | ○     | ○     | ○     | ○     | ○     | ○     | ○     | ×      | NA     |

FIG. 4

|  | D1→H15 | H15→D2 | D2→H15 | H15→D1 | D3→D4 | D4→D3 | D5→D6 | D6→D5 | D7→D8 | D8→D7 | D9→D10 | D10→D9 |
|---|---|---|---|---|---|---|---|---|---|---|---|---|
| D1→H15 | NA | × | × | × | ○ | ○ | ○ | ○ | ○ | ○ | ○ | ○ |
| H15→D2 | × | NA | × | × | ○ | ○ | ○ | ○ | ○ | ○ | ○ | ○ |
| D2→H15 | × | × | NA | × | ○ | ○ | ○ | ○ | ○ | ○ | ○ | × |
| H15→D1 | × | × | × | NA | ○ | ○ | ○ | ○ | ○ | ○ | ○ | × |
| D3→D4 | ○ | ○ | ○ | ○ | NA | × | ○ | ○ | ○ | ○ | ○ | ○ |
| D4→D3 | ○ | ○ | ○ | ○ | × | NA | ○ | ○ | ○ | ○ | ○ | ○ |
| D5→D6 | ○ | ○ | ○ | ○ | ○ | ○ | NA | × | ○ | ○ | ○ | ○ |
| D6→D5 | ○ | × | ○ | ○ | ○ | ○ | × | NA | ○ | ○ | ○ | ○ |
| D7→D8 | ○ | ○ | ○ | ○ | ○ | ○ | ○ | ○ | NA | × | ○ | ○ |
| D8→D7 | ○ | ○ | ○ | ○ | ○ | ○ | ○ | ○ | × | NA | ○ | ○ |
| D9→D10 | ○ | ○ | ○ | ○ | ○ | ○ | ○ | ○ | ○ | ○ | NA | × |
| D10→D9 | ○ | ○ | × | × | ○ | ○ | ○ | ○ | ○ | ○ | × | NA |

FIG. 5B

|  | D1→H16 | H16→H11 | H11→D2 | D2→H11 | H11→H16 | H16→D1 | D3→D4 | D4→D3 | D5→D6 | D6→D5 | D7→D8 | D8→D7 | D9→D10 | D10→D9 |
|---|---|---|---|---|---|---|---|---|---|---|---|---|---|---|
| D1→H16 | NA | × | ○ | × | × | × | ○ | ○ | ○ | ○ | ○ | ○ | ○ | ○ |
| H16→H11 | × | NA | ○ | ○ | × | × | ○ | ○ | ○ | ○ | × | ○ | ○ | ○ |
| H11→D2 | ○ | ○ | NA | × | × | × | ○ | ○ | ○ | ○ | × | × | ○ | ○ |
| D2→H11 | × | × | × | NA | × | × | ○ | ○ | × | ○ | ○ | ○ | ○ | ○ |
| H11→H16 | × | × | × | × | NA | × | ○ | ○ | × | ○ | × | ○ | ○ | ○ |
| H16→D1 | × | × | × | × | × | NA | ○ | ○ | ○ | ○ | ○ | ○ | ○ | ○ |
| D3→D4 | ○ | ○ | ○ | ○ | ○ | ○ | NA | × | ○ | ○ | ○ | ○ | ○ | ○ |
| D4→D3 | ○ | ○ | ○ | ○ | ○ | ○ | × | NA | ○ | ○ | ○ | ○ | ○ | ○ |
| D5→D6 | ○ | ○ | ○ | × | ○ | ○ | ○ | ○ | NA | × | ○ | ○ | ○ | ○ |
| D6→D5 | ○ | ○ | × | ○ | ○ | ○ | ○ | ○ | × | NA | ○ | ○ | ○ | ○ |
| D7→D8 | ○ | ○ | ○ | × | ○ | ○ | ○ | ○ | ○ | ○ | NA | × | ○ | ○ |
| D8→D7 | ○ | ○ | ○ | ○ | ○ | ○ | ○ | ○ | ○ | ○ | × | NA | ○ | ○ |
| D9→D10 | ○ | ○ | ○ | ○ | ○ | ○ | ○ | ○ | ○ | ○ | ○ | ○ | NA | × |
| D10→D9 | ○ | ○ | ○ | ○ | ○ | ○ | ○ | ○ | ○ | ○ | ○ | ○ | × | NA |

FIG. 6B

| | D1→H16 | H16→H15 | H15→D2 | D2→H15 | H15→H16 | H16→D1 | D3→D4 | D4→D3 | D5→D6 | D6→D5 | D7→D8 | D8→D7 | D9→D10 | D10→D9 |
|---|---|---|---|---|---|---|---|---|---|---|---|---|---|---|
| D1→H16 | NA | × | ○ | × | × | × | ○ | ○ | ○ | ○ | ○ | ○ | ○ | ○ |
| H16→H15 | × | NA | ○ | ○ | ○ | ○ | ○ | ○ | ○ | ○ | ○ | ○ | ○ | ○ |
| H15→D2 | ○ | ○ | NA | × | × | × | ○ | ○ | ○ | ○ | ○ | ○ | ○ | ○ |
| D2→H15 | × | × | × | NA | × | × | ○ | ○ | ○ | ○ | ○ | ○ | ○ | ○ |
| H15→H16 | × | × | × | × | NA | × | ○ | ○ | ○ | ○ | ○ | ○ | ○ | ○ |
| H16→D1 | × | × | ○ | ○ | ○ | NA | ○ | ○ | ○ | ○ | ○ | ○ | ○ | ○ |
| D3→D4 | ○ | ○ | ○ | ○ | ○ | ○ | NA | × | ○ | ○ | ○ | ○ | ○ | ○ |
| D4→D3 | ○ | ○ | ○ | ○ | ○ | ○ | × | NA | ○ | ○ | ○ | ○ | ○ | ○ |
| D5→D6 | ○ | ○ | ○ | ○ | ○ | ○ | ○ | ○ | NA | × | ○ | ○ | ○ | ○ |
| D6→D5 | ○ | ○ | ○ | ○ | ○ | ○ | ○ | ○ | × | NA | ○ | ○ | ○ | ○ |
| D7→D8 | ○ | ○ | ○ | ○ | ○ | ○ | ○ | ○ | ○ | ○ | NA | × | ○ | ○ |
| D8→D7 | ○ | ○ | ○ | ○ | ○ | ○ | ○ | ○ | ○ | ○ | × | NA | ○ | ○ |
| D9→D10 | ○ | ○ | ○ | ○ | ○ | ○ | ○ | ○ | ○ | ○ | ○ | ○ | NA | × |
| D10→D9 | ○ | ○ | ○ | ○ | ○ | ○ | ○ | ○ | ○ | ○ | ○ | ○ | × | NA |

FIG. 7B

DEVICE-TO-DEVICE WIRELESS COMMUNICATION METHOD, DEVICE AND SYSTEM FOR DATA TRANSMISSION

This application claims the benefit of Taiwan application Serial No. 105141825, filed Dec. 16, 2016, the disclosure of which is incorporated by reference herein in its entirety.

TECHNICAL FIELD

The disclosure relates to a wireless communication method, device and system.

BACKGROUND

Along with develop of the wires wideband network and mobile communication, a variety of mobile device become popular. The variety of mobile devices and application services, the user may do work, human interaction, entertainment via the mobile devices.

However, in the current technology, data and control signals of the wireless communication are transmitted via the core network or the base stations, and thus the core network or the base stations may be congested. Therefore, direction communication technology which may bypass the core network and the base stations becomes more important. Device-to-Device (D2D) communication is one of the direction communication.

In D2D communication, the sender and the receiver may directly communicate and transmit data with each other without passing through the core network and the base stations. Thus, the loading of the core network and the base stations are relieved. Further, in case of no interference, more than one D2D links are allowed to transmit data at the same time, and thus the data transmission efficiency is improved.

However, in high user density, more D2D links, the worse interference between the D2D links. Especially, the long D2D link (which has long transmission distance and a large transmission area) will easy cause interference on other D2D links.

SUMMARY

One embodiment of the disclosure is directed to a wireless communication method including: determining at least one interfering link among a plurality of wireless communication links; finding at least one first wireless communication helper group of the at least one interfering link, the at least one first wireless communication helper group including at least one wireless communication helper; based on a respective interference improvement of the at least one first wireless communication helper group on the at least one interfering link, selecting at least one target interfering link from the at least one interfering link; and performing link re-establishment on the at least one target interfering link.

Another embodiment of the disclosure is directed to a wireless communication management system including: at least two user devices forming a first wireless communication link; at least one wireless communication helper; and a communication management device wireless coupled to the at least two user devices and the at least one wireless communication helper. The communication management device determines whether the first wireless communication link is an interfering link. When the communication management device determines the first wireless communication link is the interfering link, the communication management device determines whether the at least one wireless communication helper is useful in improving interference of the interfering link. When the communication management device determines the at least one wireless communication helper is useful in improving interference of the interfering link, the communication management device commands to re-establish the first wireless communication link between the at least two user devices to form multi-hop links between the at least two user devices and the at least one wireless communication helper.

Yet another embodiment of the disclosure is directed to a wireless communication management device including: an interfering link identification unit being configured for determining at least one interfering link among a plurality of wireless communication links; a wireless communication helper group selection unit being configured for finding at least one first wireless communication helper group of the at least one interfering link, the at least one first wireless communication helper group including at least one wireless communication helper; a target interfering link selection unit being configured for, based on a respective interference improvement of the at least one first wireless communication helper group on the at least one interfering link, selecting at least one target interfering link from the at least one interfering link; and a wireless communication link re-establishment unit being configured for performing link re-establishment on the at least one target interfering link.

BRIEF DESCRIPTION OF THE DRAWINGS

FIG. 4 shows a directional link interference table of FIG. 2.

FIG. 5B shows a directional link interference table of FIG. 5A.

FIG. 6B shows a directional link interference table of FIG. 6A.

FIG. 7B shows a directional link interference table of FIG. 7A.

Figure 1:
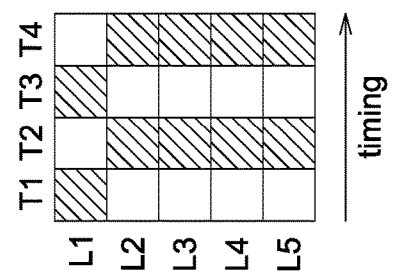
FIG. 1 shows a D2D (Device-to-Device) communication link and the radio resource allocation example of the D2D communication link.
Figure 1:
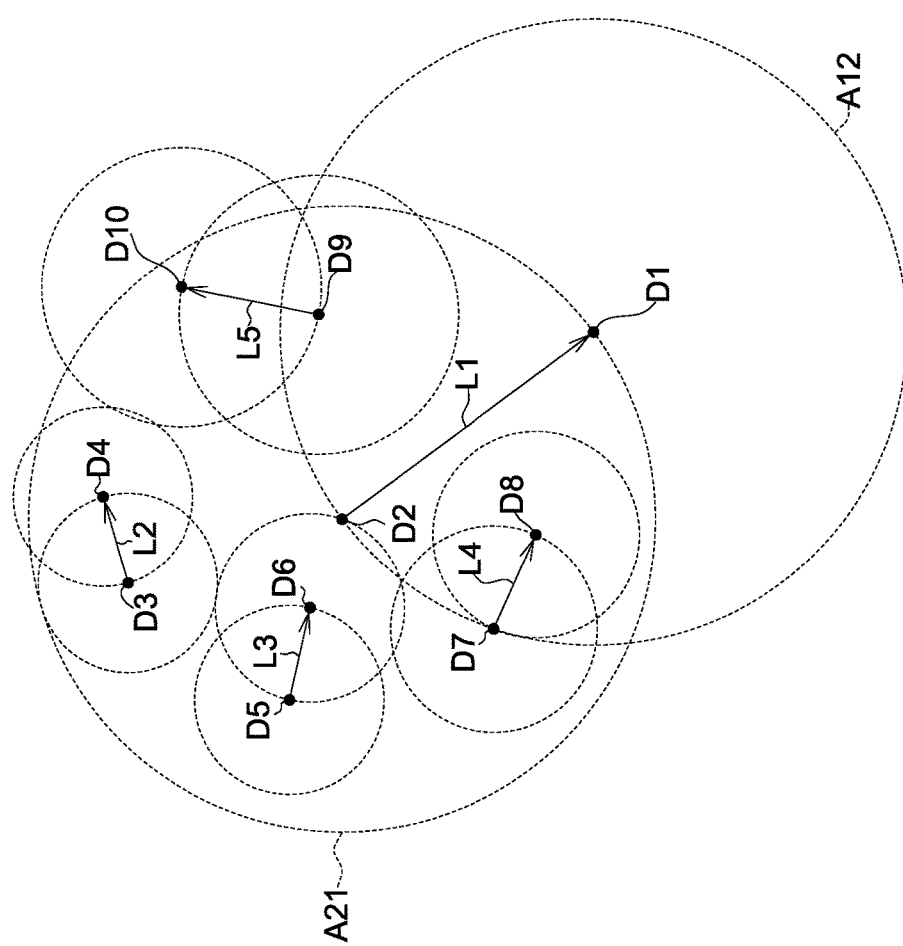

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 shows a D2D (Device-to-Device) communication link and the radio resource allocation example of the D2D communication link. FIG. 1 shows 10 user devices D1-D10. D2D link L1(D2→D1), which represents transmission from the user device D2 to the user device D1, has a transmission range A21 covering the receivers of the D2D links L2-L5 (i.e. the user devices D4, D6, D8 and D10). Thus, transmission of the D2D link L1(D2→D1) interferes with transmission of the D2D links L2-L5. In other words, when the D2D link L1(D2→D1) is transmitting, the receivers of the D2D links L2-L5 (i.e. the user devices D4, D6, D8 and D10) would be interfered, and thus may cause the quality of the received signal not good or may cause data not received correctly.

As shown in the radio resource allocation of FIG. 1, it is assumed that the user devices D1-D10 transmit on the same channel. In timing T1 and T3, to prevent the interference from the D2D link L1(D2→D1), the D2D link L1(D2→D1) is allowed to transmit while the transmission of the D2D links L2-L5 are postponed. Likewise, at timing T2 and T4, the D2D links L2-L5 are allowed to transmit while transmission of the D2D link L1(D2→D1) is postponed. In brief, if any interference exists, efficiency of the D2D communication will be influenced. In the following, the D2D link(s) which has/have interferences on other D2D link(s) is/are referred as "interfering D2D link(s)".

In the embodiments of the application, when it is identified that any interfering D2D link(s) exists, via D2D helper group, the long distance D2D link is re-established as multi-hop D2D links to lowering interference on other D2D links.

Figure 2:
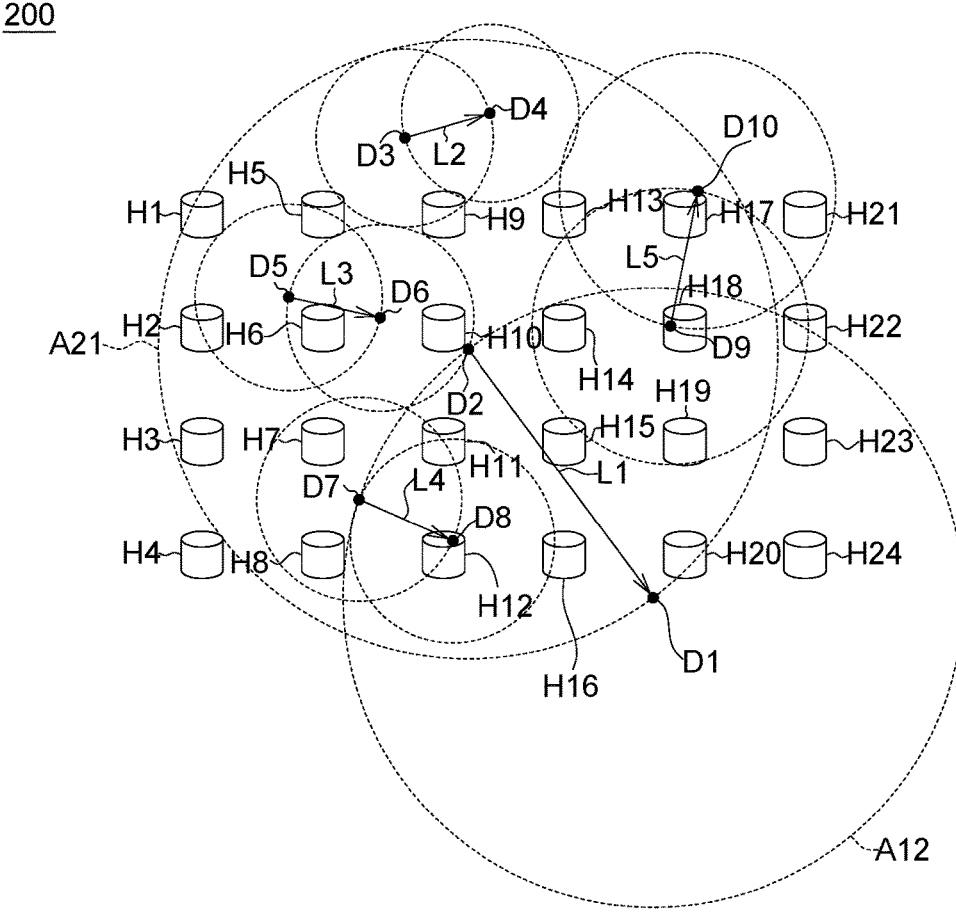
FIG. 2 shows a wireless communication system according to an embodiment of the application.
Figure 3:
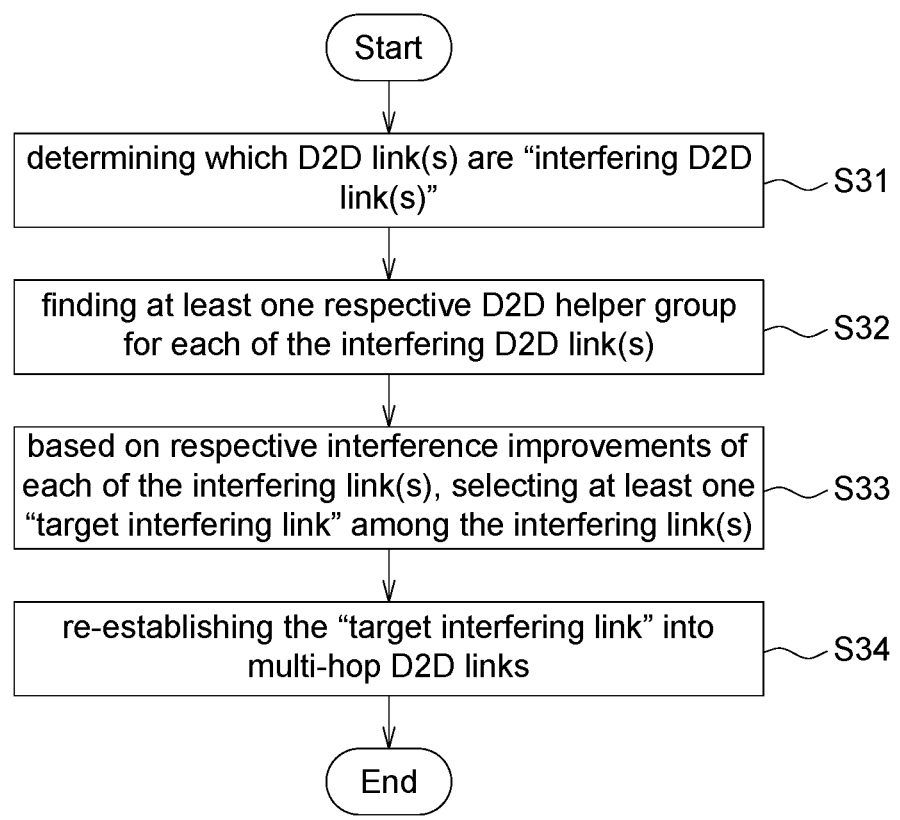
FIG. 3 shows a flow chart of a wireless communication method according to an embodiment of the application.

FIG. 2 shows a wireless communication system according to an embodiment of the application. FIG. 3 shows a flow chart of a wireless communication method according to an embodiment of the application.

As shown in FIG. 2, the wireless communication system 200 according to an embodiment of the application includes a plurality of user devices and a plurality of D2D helpers. FIG. 2 shows 10 user devices D1-D10 and 24 D2D helpers H1-H24. However, the application is not limited by.

In the following, the D2D link L1(D2→D1) refers to that the user device D2 is a sender while the user device D1 is a receiver. Similarly, the D2D link L1(D1→D2) refers to that the user device D1 is a sender while the user device D2 is a receiver. Besides, the D2D link may be a directional link, for example, having a direction from the sender to the receiver.

As shown in FIG. 2, when the D2D link L1(D2→D1) or the D2D link L1(D1→D2) is in transmission, D2D links L2-L5 will be interfered. Thus, in the embodiment of the application, via the flow chart of FIG. 3, the D2D link L1(D2→D1) and the D2D link L1(D1→D2) will be re-established as multi-hop links.

Now refer to FIG. 3. In step S31, it is determined that which D2D link(s) are "interfering D2D link(s)". In the following, the D2D links may be also referred as wireless communication links.

In step S32, for the interfering D2D link(s), at least one respective D2D helper group (also referred as "wireless communication helper group") for each of the interfering D2D link(s) is found.

In step S33, based on respective interference improvements of each of the interfering D2D link(s), selecting at least one "target interfering D2D link" among the interfering D2D link(s), wherein the "target interfering D2D link" is considered as the link re-establishment target. For example but not limited by, the "target interfering D2D link" has better interference improvement.

In step S34, the "target interfering D2D link" in step S33 is re-established and accordingly, the "target interfering D2D link" is re-established into multi-hop D2D links (also referred as "multi-hop wireless links").

Details of steps S31-S34 will be described later.

Now, details of step S31 about how to identify the "interfering link" are described. A directional interference table based on transmission of FIG. 2 is shown in FIG. 4, to show the respective interference amount of each D2D link. In FIG. 4, "O" refers to link interference, "X" refers to no link interference and "NA" refers to not available. As shown in FIG. 2 and FIG. 4, the D2D link L1(D1→D2) interferes on three D2D links, i.e. the D2D links L4(D7→D8), L4(D8→D7) and L5(D10→D9). Thus, the interference amount of the D2D link L1(D1→D2) is 3. The interference amount refers to the number of other D2D links interfered by the D2D link.

Similarly, the D2D link L1(D2→D1) interferes on eight D2D links, i.e. the D2D link L2(D3→D4), L2(D4→D3), L3(D5→D6), L3(D6→D5), L4(D7→D8), L4(D8→D7), L5(D9→D10) and L5(D10→D9). Thus, the interference amount of the D2D link L1(D2→D1) is 8. The D2D link L2-L5 does not interfere on other D2D links, and thus the respective interference amounts of the D2D links L2-L5 are 0.

Besides, the D2D link also interferes on its own reverse D2D link. For example, the D2D link L1(D2→D1) interferes with the D2D link L1(D1→D2). However, in the following, the interference caused by the D2D link on its own reverse D2D link is excluded in calculating the interference amount. For example, in FIG. 4, in calculating the interference amount of the D2D link L1(D1→D2), the interference caused by the D2D link L1(D1→D2) on its own reverse D2D link L1(D2→D1) is excluded.

In the embodiments of the application, the D2D link(s) having the interference amount equal to or higher than an interference amount threshold m (wherein m, for example, is a predetermined natural number and is adjustable) is called as the "interfering link" or "interfering D2D link". In here, the interference amount threshold m is equal to 3 as an example but the application is not limited by this.

As shown in FIG. 4, the D2D link L1(D1→D2) and the D2D link L1(D2→D1) will be determined as the "interfering link" because the respective interference amounts of the D2D link L1(D1→D2) and the D2D link L1(D2→D1) are 3 and 8, which are both equal to or higher than the interference amount threshold m (m=3). That is, based on whether the respective interference amounts of the D2D link(s) are equal to or higher than the interference amount threshold, the embodiment of the application determines whether the D2D links are determined as the "interfering link", respectively.

Further, in the embodiment of the application, if a directional D2D link is determined as the "interfering link", its reverse D2D link will not be necessarily determined as the "interfering link".

In the step S31, based on the location information of the sender and the receiver of the D2D link, and based on the channel quality information, the directional link interference table is established and one or more "interfering links" are determined. That is, the directional link interference table is determined based on the respective location information of the sender of each of the D2D links, the respective location information of the receiver of each of the D2D links, and the respective channel quality information.

Details of the step S32 are described about determination of at least one respective D2D helper group for each of the interfering D2D link(s). In the following, all respective D2D helper groups for each of the interfering D2D link(s) are determined and the application is not limited by.

In the embodiment of the application, the D2D helper which is used to improve the interfering link is referred as a D2D helper group wherein the D2D helper group may include one or more D2D helpers.

In one embodiment of the application, the principle in selecting the D2D helper may include the following, for example but not limited by: (1) the selected D2D helper is located in both the transmission range of the interfering link and the transmission range of the reverse link of the interfering link; (2) in the D2D helper group, the D2D helpers are directionally arranged based on a link direction (the link direction is defined as from the sender of the interfering link to the receiver of the interfering link), and the rear D2D helper, compared with the front D2D helper, is closer to the receiver, wherein the "rear" and the "front" is based on the direction from the sender to the receiver and the details will be described later (that is, the sender is at the front and the receiver is at the rear); and (3) the total signal transmission distance is desired to be short (the total signal transmission distance refers to a total of the distance between the sender to the selected D2D helper, the distance between the selected D2D helpers and the distance between the selected D2D helper to the receiver). By these selection principles, the signal transmission distance may be reduced to improve the interference. That is, based on the total signal transmission distance between the selected D2D helpers (which is selected by the selection principle (1)), the sender of the interfering link and the receiver of the interfering link, the embodiment of the application determines the D2D helper group includes which one(s) of the D2D helpers (i.e. which one(s) of the D2D helpers are used to form the D2D helper group).

Taking FIG. 2 as an example, based on the selection principle (1) (the selected D2D helper is located in both the transmission range of the interfering link and the transmission range of the reverse link of the interfering link), the D2D helpers H11, H12, H14-H16 and H18-H20 are located in both the transmission range A12 of the interfering D2D link L1(D1→D2) and the transmission range A21 of the interfering D2D link L1(D2→D1). Therefore, based on the selection principle (1), the 8 D2D helpers H11, H12, H14-H16 and H18-H20 are selected and other D2D helpers are not selected.

Figure 5A:
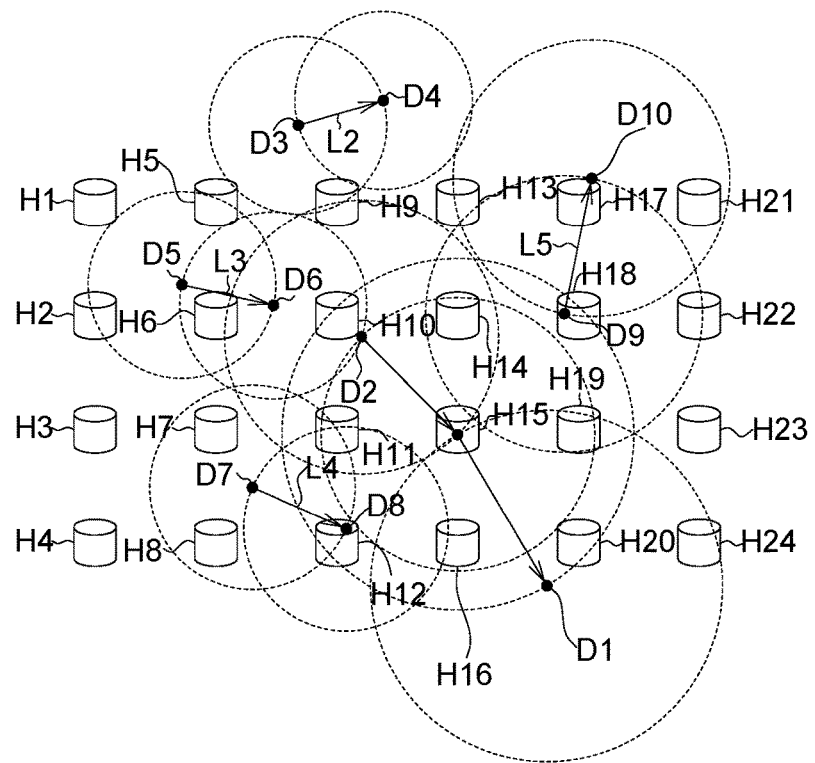
FIG. 5A shows an example of selecting one D2D helper according to an embodiment of the application.

Now, the selection principle (2) (the rear D2D helper is closer to the receiver than the front D2D helper) and the selection principle (3) (the total signal transmission distance is desired to be short) are described. In one embodiment of the application, the case when the D2D helper group includes "i" (i is an integer and in this case i=1) D2D helper is described. As shown in FIG. 2, when i=1 (i.e. one D2D helper is selected), in order that the total signal transmission distance is as short as possible, the D2D helper H15 is selected. This is because, the total signal transmission distance between the sender D2, the selected D2D helper H15 and the receiver D1 is shortest. For example, as for another D2D helper H16, the total signal transmission distance between the sender D2, the D2D helper H16 and the receiver D1 is longer than the total signal transmission distance between the sender D2, the selected D2D helper H15 and the receiver D1. FIG. 5A shows an example of selecting the D2D helper H15 according to an embodiment of the application.

In one embodiment of the application, the case when the D2D helper group includes "i" (i is an integer and in this case i=2) D2D helpers is described. As shown in FIG. 2, when i=2 (i.e. two D2D helpers are selected), there are two selection results (i.e. two D2D helper groups are formed). One of the D2D helper groups includes the D2D helpers H11 and H16 (i.e. the D2D helpers H11 and H16 are selected) while the other of the D2D helper groups includes the D2D helpers H15 and H16 (i.e. the D2D helpers H15 and H16 are selected). Besides, if the D2D helper group includes two or more D2D helpers, then the rear D2D helper is closer to the receiver than the front D2D helper to the receiver. For example, in case that the D2D helper group includes the D2D helpers H11 and H16, the rear D2D helper (i.e. H16) is closer to the receiver (i.e. D1) than the front D2D helper (i.e. H11) to the receiver.

Figure 6A:
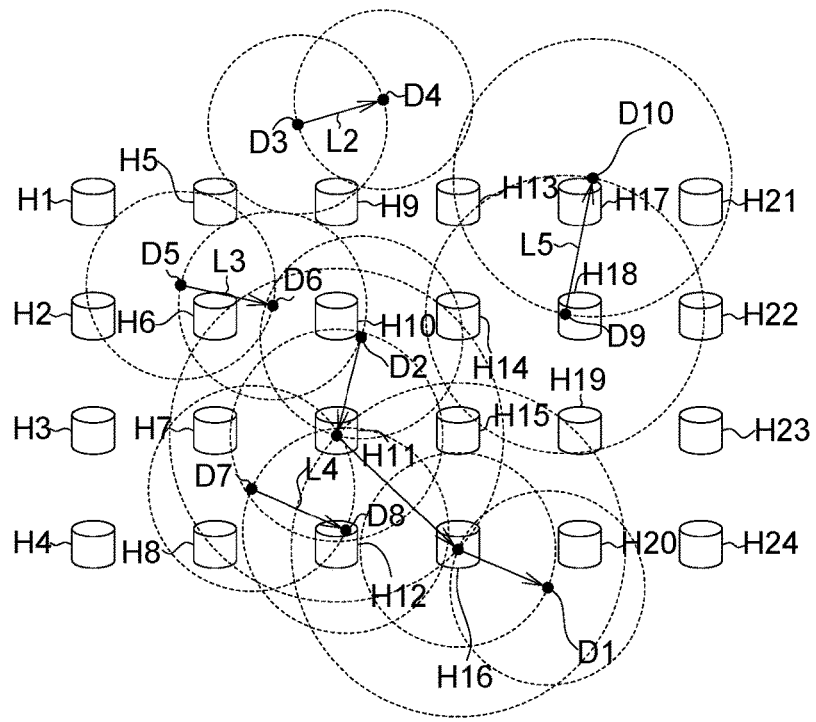
FIG. 6A shows an example of selecting two D2D helpers according to an embodiment of the application.
Figure 7A:
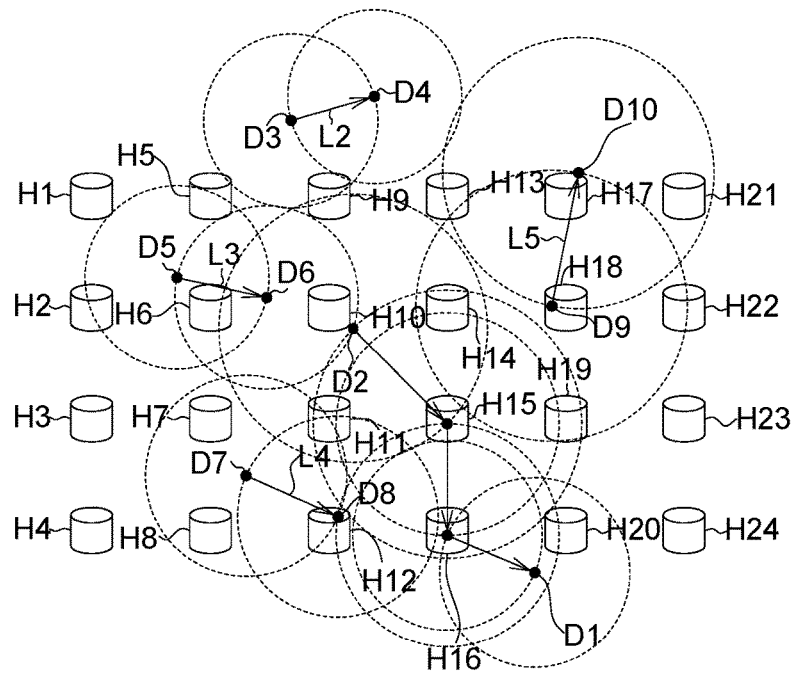
FIG. 7A shows another example of selecting two D2D helpers according to an embodiment of the application.

In one embodiment of the application, the case when the D2D helper group includes "i" (i is an integer and in this case i=3) D2D helpers is described. As shown in FIG. 2, when i=3 (i.e. to select three D2D helpers), none of the D2D helpers meets the selection principle. Thus, in the example of FIG. 2, "i=1" and "i=2" will meet the selection principles, but "i≥3" does not meet the selection principles. Of course, the application is not limited by this. FIG. 6A shows an example of selecting two D2D helpers H11 and H16 (i=2) according to an embodiment of the application; and FIG. 7A shows another example of selecting two D2D helpers H15 and H16 (i=2) according to an embodiment of the application. In addition, in an embodiment of the disclosure, an upper limit imax of the parameter i (amount of D2D helper) may be determined, and the upper limit imax is adjustable.

Based on the all selected D2D helper group, the respective directional link interference tables are established, as shown in FIG. 5B, FIG. 6B and FIG. 7B. FIG. 5B shows a directional link interference table of FIG. 5A. FIG. 6B shows a directional link interference table of FIG. 6A. FIG. 7B shows a directional link interference table of FIG. 7A.

The respective interference improvement factors for all selected D2D helper groups are calculated. In one embodiment of the application, the interference improvement factor is, for example but not limited by, "{[(the link-interference-free ratio after improvement)+1]/[(the link-interference-free ratio before improvement)+1]}−1", which is described later. That is, the link-interference-free ratio before improvement (also referred as "the first link-interference-free ratio") is not related to the D2D helper group while the link-interference-free ratio after improvement (also referred as "the second link-interference-free ratio") is related to the D2D helper group. "The link-interference ratio" refers to that: the interference ratio of all other D2D links caused by the D2D link. That is, "the link-interference ratio" may be expressed as: the ratio of "the number of the D2D links which are interfered by the D2D link" to "the number of all other D2D links". "The link-interference-free ratio" may be expressed as: the ratio of "the number of the D2D links which are not interfered by the D2D link" to "the number of all other D2D links", or, among all other D2D links, the link ratio which is not interfered by the D2D link. Therefore, "the link-interference-free ratio" may be expressed as: 1−"the link-interference ratio".

In one embodiment of the application, "all other D2D link" does not include the D2D link and its reverse D2D link. For example, as shown in FIG. 4, the all other D2D links of the D2D link L1 (D1→D2) include: L2(D3→D4), L2(D4→D3), L3(D5→D6), L3(D6→D5), L4(D7→D8), L4(D8→D7), L5(D9→D10) and L5(D10→D9), but does not include L1 (D1→D2) and L1(D2→D1). That is, the number of the "all other D2D links" of the D2D link L1 (D1→D2) is 8.

Further, the interference improvement factor is related to the first link-interference-free ratio and the second link-interference-free ratio. The first link-interference-free ratio is obtained from the directional link interference table of FIG. 4 while the second link-interference-free ratio is obtained from the directional link interference table of FIG. 5B, or FIG. 6B or FIG. 7B.

Refer to FIG. 4 again. As for the D2D link L1(D1→D2), the interference amount before improvement is 3 but the "all other D2D links" before improvement is 8. Thus, the link interference ratio before improvement is 3/8 and the link-interference-free ratio before improvement is 1−3/8=5/8. As for the D2D link L1(D2→D1), the interference amount before improvement is 8 but the "all other D2D links" before improvement is 8. Thus, the link interference ratio before improvement is 8/8 and the link-interference-free ratio before improvement is 1−8/8=0.

As shown in FIG. 5B, as for the D2D links (D1→H15) and (H15→D2), the interference amount after improvement is 0 but the "all other D2D links" after improvement is 16. Thus, the link interference ratio after improvement is 0/16 and the link-interference-free ratio after improvement is 1−0/16=16/16. So, as for the D2D link (D1→D2), the interference improvement factor (when the D2D helper H15 is selected) is: $\{[1-(0/16)+1]/[(1-(3/8)+1]\}-1=[2/(13/8)]-1=3/13$. In the embodiment of the application, all other D2D links do not include the D2D link itself and its reverse D2D link. Thus, as shown in FIG. 5B, all other D2D links of the D2D links (D1→H5) and (H15→D2) do not include D2D links (D1→H5), (H15→D2), (D2→H5) and (H15→D1).

Similarly, as shown in FIG. 5B, as for the D2D links (D2→H15) and (H15→D1), the interference amount after improvement is 4 but the "all other D2D links" after improvement is 16. Thus, the link interference ratio after improvement is 4/16 and the link-interference-free ratio after improvement is 1−4/16=12/16. So, as for the D2D link (D2→D1), the interference improvement factor (when the D2D helper H15 is selected) is: $\{[(1-4/16)+1]/[(1-8/8)+1]\}-1=[(28/16)/(1)]-1=3/4$.

Similarly, refer to FIG. 4 and FIG. 6B again. As shown in FIG. 6B, as for the D2D links (D1→H16), (H16→H11) and (H11→D2), the interference amount after improvement is 3 but the "all other D2D links" after improvement is 24. Thus, the link interference ratio after improvement is 3/24 and the link-interference-free ratio after improvement is 1−(3/24)=21/24. So, as for the D2D link (D1→D2), the interference improvement factor (when the D2D helpers H16 and H11 are selected) is: $\{[(1-3/24)+1]/[(1-3/8)+1]\}-1=[(45/24)/(13/8)]-1=2/13$.

Similarly, as shown in FIG. 6B, as for the D2D links (D2→H11), (H11→H16) and (H16→D1), the interference amount after improvement is 4 but the "all other D2D links" after improvement is 24. Thus, the link interference ratio after improvement is 4/24. So, as for the D2D link (D2→D1), the interference improvement factor (when the D2D helpers H16 and H11 are selected) is: $\{[(1-4/24)+1]/[(1-8/8)+1]\}-1=(44/24)-1=20/24=5/6$.

Similarly, refer to FIG. 4 and FIG. 7B again. As shown in FIG. 7B, as for the D2D links (D1→H16), (H16→H15) and (H15→D2), the interference amount after improvement is 1 but the "all other D2D links" after improvement is 24. Thus, the link interference ratio after improvement is 1/24 and the link-interference-free ratio after improvement is 1−(1/24)=23/24. So, as for the D2D link (D1→D2), the interference improvement factor (when the D2D helpers H16 and H15 are selected) is: $\{[(1-1/24)+1]/[(1-3/8)+1]\}-1=(47/39)-1=8/39$.

Similarly, as shown in FIG. 7B, as for the D2D links (D2→H15), (H15→H16) and (H16→D1), the interference amount after improvement is 1 but the "all other D2D links" after improvement is 24. Thus, the link interference ratio after improvement is 1/24. So, as for the D2D link (D2→D1), the interference improvement factor (when the D2D helpers H16 and H15 are selected) is: $\{[(1-1/24)+1]/[(1-8/8)+1]\}-1=[(47/24)/1]-1=23/24$.

In the step S32, at least one D2D helper group for each of the interfering links is found.

Now, details of the step S33 are described about the determination of the "target interfering link". In the embodiment of the application, based on the respective interference improvements of each of the interfering links, the interfering link having the best interference improvement is defined as the "target interfering link". In the above example, the interference improvement factors of the D2D link (D1→D2) are 3/13 (i=1 when the D2D helper H15 is selected), 2/13 (i=2 when the D2D helpers H16 and H11 are selected) and 8/39 (i=2 when the D2D helpers H16 and H15 are selected). The interference improvement factors of the D2D link (D2→D1) are 3/4 (i=1 when the D2D helper H15 is selected), 5/6 (i=2 when the D2D helpers H16 and H11 are selected) and 23/24 (i=2 when the D2D helpers H16 and H15 are selected). Among the 6 interference improvement factors, the maximum interference improvement factor is 23/24 (D2D link (D2→D1), i=2 when the D2D helpers H16 and H15 are selected). In the embodiment of the application, the interfering link having the best interference improvement is defined as the "target interfering link". Thus, in the above example, the D2D link (D2→D1) is determined as the "target interfering link", and the D2D helper group related to the "target interfering link" is determined as the "target D2D helper group". In the above example, i=2 and the D2D helpers H16 and H15 are selected, i.e. the "target D2D helper group" includes the D2D helpers H16 and H15.

Further, in the step S33, based on the "target interfering link", its reverse D2D link is considered to determine the target D2D helper group which has best interference improvements on the reverse D2D link. In the above example, the D2D link (D2→D1) is determined as the "target interfering link" and the reverse D2D link of the "target interfering link" is the D2D link (D1→D2). The interference improvement factors of the D2D link (D1→D2) are 3/13 (i=1 when the D2D helper H15 is selected), 2/13 (i=2 when the D2D helpers H16 and H11 are selected) and 8/39 (i=2 when the D2D helpers H16 and H15 are selected). In the 3 interference improvement factors, the maximum interference improvement factor is 3/13 (i=1 when the D2D helper H15 is selected). Thus, the D2D helper group (i=1 when the D2D helper H15 is selected) is determined as the target D2D helper group of the reverse D2D link.

Although in the above example, the target interfering link and its reverse D2D link have different target D2D helper groups but the application is not limited by. Person having ordinary skill art would understand that the target interfering link and its reverse D2D link may have the same target D2D helper group.

Further, in the embodiment of the application, the number of the target interfering link is one but in other possible embodiment of the application, the number of the target interfering link may be two or more, which is still within the spirit of the application.

Further, as for determining the target interfering link, in selecting the target D2D helper group, if there are two or more D2D helper groups both substantially having the best interference improvement factor (i.e. their interference improvement factors are the same or very close to each other), then the D2D helper group having fewer D2D helpers (i.e. with smaller "i") may be determined as the target D2D helper group (i.e. the determination may be based on the number of the D2D helpers in the D2D helper group). For example, in other possible embodiment of the application, after determining the target interfering link, there are two D2D helper groups having interference improvement factors that are the same or very close to each other. One of the two D2D helper groups includes one D2D helper (i.e. "i"=1) and the other of the two D2D helper groups includes two D2D helpers (i.e. "i"=2). Thus, the D2D helper group including one D2D helper (i.e. "i"=1) may be determined as the target D2D helper group. That is because the determination result will reduce the transmission delay. The more D2D helpers, the worse the transmission delay. That is, when there are two D2D helper groups having interference improvement factors that are the same or very close to each other, the target D2D helper group may be determined based on the respective number of the D2D helpers in the D2D helper groups.

Now, the details of the step S34 are described. The target interfering link determined in the step S33 is re-established into multi-hop D2D links. In the above example, the D2D link (D2→D1) is determined as the target interfering link and the target D2D helper group includes the D2D helpers H16 and H15 (i=2). The reverse D2D link of the target interfering link is (D1→D2) which has the target D2D helper group including the D2D helper H15 (i=1).

In link re-establishing, based on the target D2D helper group, the target interfering link (D2→D1) is re-established as the D2D multi-hop links (D2→H15), (H15→H16) and (H16→D1), as shown in FIG. 7A. The reverse link (D1→D2) of the target interfering link is re-established as the D2D the respective location information of the sender and the receiver of each of the D2D links (D1→H15) and (H15→D2), as shown in FIG. 5A.

Thus, refer to FIG. 5A and FIG. 7A. In the embodiment of the application, by re-establishing the target interfering link, the interference may be reduced and thus more D2D links may communicate at the same time.

Figure 8:
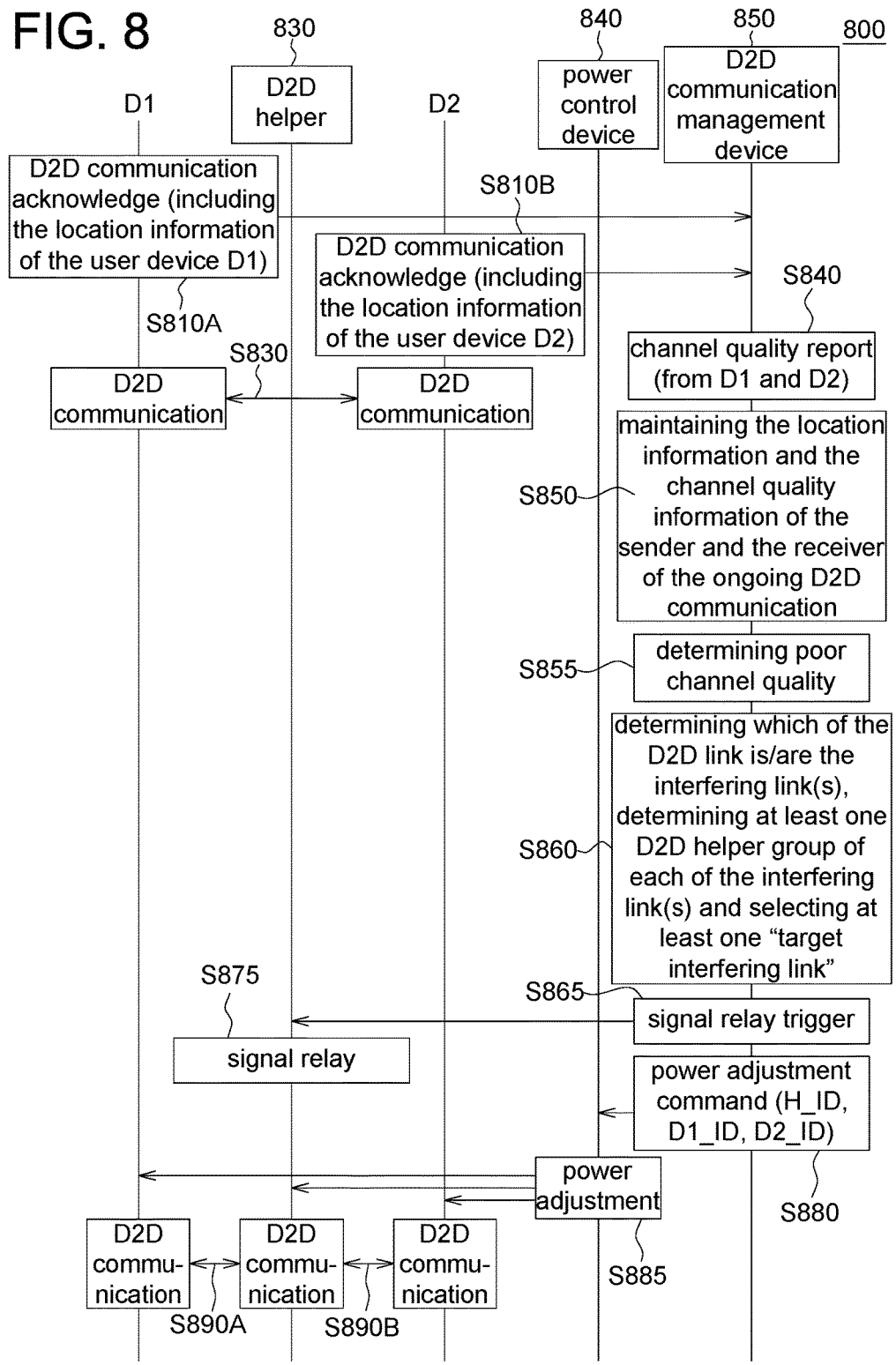
FIG. 8 shows a wireless communication system and the operation thereof according to an embodiment of the application, wherein the D2D helper has a function of signal relaying.
Figure 9:
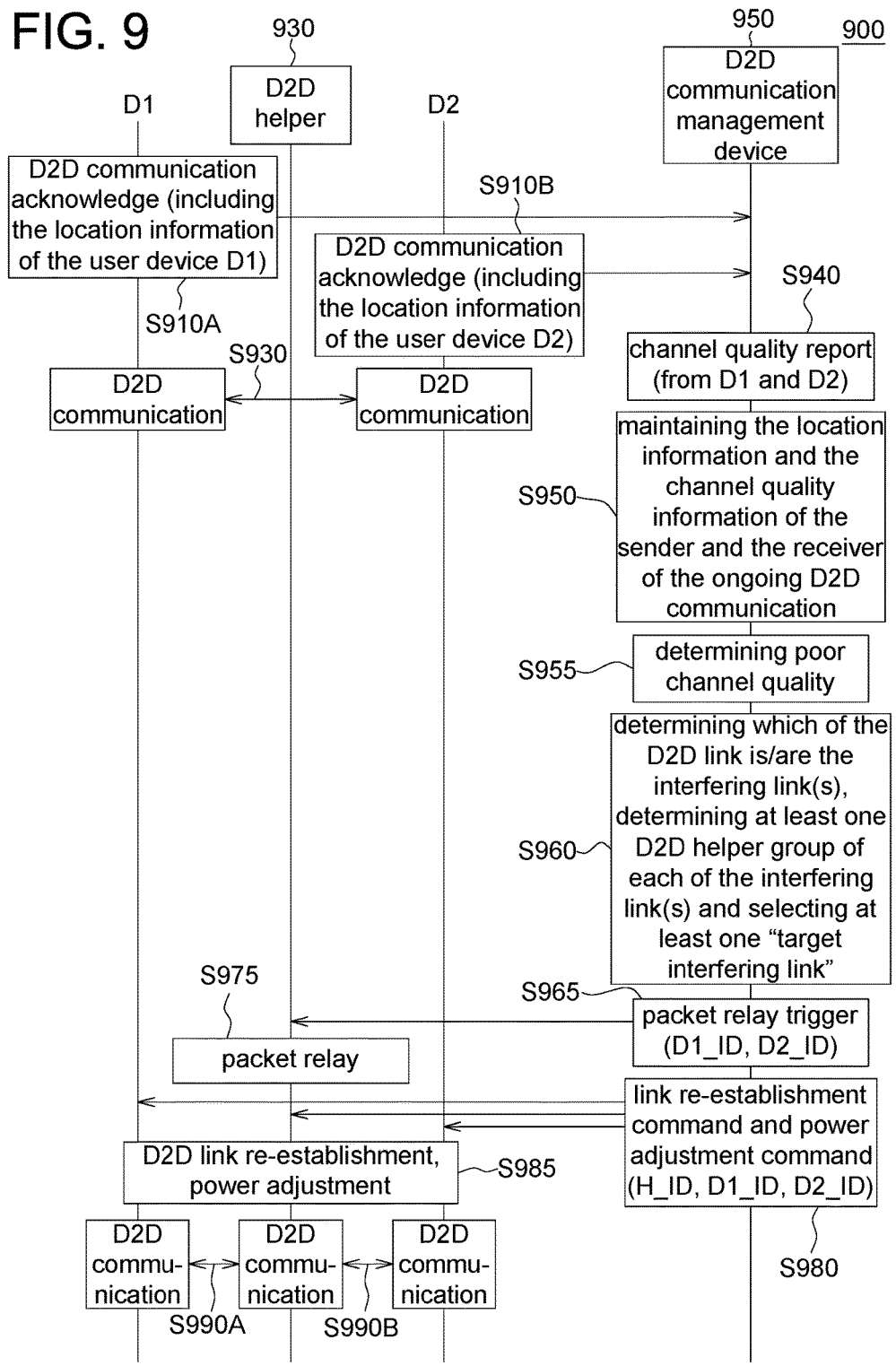
FIG. 9 shows a wireless communication system and the operation thereof according to an embodiment of the application, wherein the D2D helper has a function of packet relaying.

The wireless communication system of the embodiment of the application is described. Refer to FIG. 8 and FIG. 9. FIG. 8 shows a wireless communication system and the operation thereof according to an embodiment of the application, wherein the D2D helper has a function of signal relaying. FIG. 9 shows a wireless communication system and the operation thereof according to an embodiment of the application, wherein the D2D helper has a function of packet relaying.

As shown in FIG. 8, the wireless communication system 800 includes at least two user devices D1 and D2, at least one D2D helper 830, a power control device 840 and a D2D communication management device 850. The user devices D1 and D2, the D2D helper 830, the power control device 840 and the D2D communication management device 850 are wires coupled. The wireless communication system 800 according to the embodiment of the application may include more user devices and/or more D2D helpers, which are within the spirit and scope of the application.

In the step S810A, the user device D1 sends a D2D communication acknowledge (including the location information of the user device D1) to the D2D communication management device 850.

In the step S810B, the user device D2 sends a D2D communication acknowledge (including the location information of the user device D2) to the D2D communication management device 850. The steps S810A and S810B may be performed at the same time but the application is not limited by.

In the step S830, the user devices D1 and D2 perform D2D communication.

In the step S840, the user devices D1 and D2 send the channel quality report or information of the D2D communication to the D2D communication management device 850. The steps S830 and S840 may be performed at the same time but the application is not limited by.

In the step S850, the D2D communication management device 850 maintains the location information and the channel quality information of the sender and the receiver (i.e. the user devices D1 and D2) of the ongoing D2D communication.

In the step S855, based on all channel quality information, the D2D communication management device 850 determines whether any of the D2D links has bad channel quality due to link interference, or the D2D communication management device 850 determines whether other D2D links are interfered by the D2D link so that other D2D links have poor channel quality. For example, as shown in FIG. 2, when the D2D link L2 is interfered by the D2D link L1 (D2→D1), the channel quality of the D2D link L2 is lowered. When the D2D communication management device 850 determines that the channel quality of the D2D link L2 is lowered, the D2D communication management device 850 triggers the D2D link re-establishment to re-establish the target interfering link (D2D link L1 (D2→D1)). The D2D communication management device 850 determines whether the D2D link L1 (D2→D1) is an interfering link.

In the step S860, the D2D communication management device 850 determines which of the D2D link is/are the interfering link(s), determines at least one D2D helper group of each of the interfering link(s) and selects at least one "target interfering link". The details of the step S860 may be referred to the steps S31-S33 of FIG. 3. That is, the D2D communication management device 850 determines whether the D2D helper 830 is useful in improving the D2D link L1 (when the D2D link L1 is determined as the interfering link). For example but not limited by, based on the above selection principles (1)-(3), the D2D communication management device 850 determines whether the D2D helper 830 is useful in improving the D2D link L1 (when the D2D link L1 is determined as the interfering link). For simplicity, in the following, the D2D helper 830 is determined as being useful in improving the D2D link L1 (when the D2D link L1 is determined as the interfering link).

In the step S865, the D2D communication management device 850 sends a "signal relay trigger" signal to the D2D helper 830.

In the step S875, the D2D helper 830 begins signal relay. "Signal relay" refers to that, the D2D helper 830 does not change the packet content sent from the user devices D1 and D2, and then transfers the packet to the target user device. For example, in case that the user device D1 sends a packet to the user device D2, the source IP (internet protocol) address in the packet from the user device D1 is D1_ID and the target IP address is D2_ID. When the D2D helper 830 receives this packet, the D2D helper 830 sends the packet (having the source IP address as D1_ID and the target IP address as D2_ID) to the user device D2.

In the step S880, the D2D communication management device 850 sends a "power adjustment command" (which includes the identification number D1_ID of the user device D1, the identification number D2_ID of the user device D2 and the identification number H_ID of the D2D helper 830) to the D2D helper 830.

In the step S885, the power control device 840 adjusts the respective power consumption of the user devices D1-D2 and the D2D helper 830. For example, after power adjustment, the signal coverage range of the user device D1 just covers the D2D helper 830, as shown in FIG. 7A. Similarly, after power adjustment, the signal coverage range of the user device D2 just covers the D2D helper 830, as shown in FIG. 7A. By so, the interference may be improved. After the power of the D2D helper 830 is adjusted, the signal coverage range of the D2D helper 830 just covers the user devices D1-D2. By so, the interference may be improved.

In steps S890A and S890B, after link re-establishment, the user device D1 may perform D2D communication with the D2D helper 830 and the user device D2 may perform D2D communication with the D2D helper 830. That is, when the D2D communication management device 850 determines that the D2D helper 830 is useful in improving the D2D link L1, the D2D communication management device 850 commands to re-establish the link between the user device D1 and D2. That is, the D2D communication management device 850 commands to form multi-hop links between the user device D1, the D2D helper 830 and the user device D2.

In one embodiment, the steps S865-S890B may be detailed steps of the step S34 of FIG. 3.

Further, in FIG. 8 (when the D2D helper 830 is used as a signal relay device), the power control device 840 may be an independent device (for example, a base station). In other possible embodiments of the application, the power control device 840 may be integrated into the D2D communication management device 850. Alternatively, the power control device 840 may be integrated into the user device D1 or D2. These are within the spirit of the application. In other words, in other possible embodiments of the application, when the D2D helper 830 is used as a signal relay device, the wireless communication system may include an integrated power control device (integrated in the base station, and/or the D2D communication management device 850, and/or the user devices D1 and/or D2), which is within the spirit of the application.

Now refer to FIG. 9. The wireless communication system 900 includes at least two user devices D1 and D2, at least one D2D helper 930 and a D2D communication management device 950. The user devices D1 and D2, the D2D helper 930 and the D2D communication management device 950 are wires coupled. The wireless communication system 900 according to the embodiment of the application may include more user devices and/or more D2D helpers, which are within the spirit and scope of the application.

The details of the steps S910A-S960 may be the same or similar to that of the steps S810A-S860 of FIG. 8 and thus, the details of the steps S910A-S960 are omitted here.

In step S965, the D2D communication management device 850 sends a "packet relay trigger" signal to the D2D helper 830, wherein the packet relay trigger signal includes the identification number D1_ID of the user device D1 and the identification number D2_ID of the user device D2.

In step S975, the D2D helper 930 begins packet relay. "Packet relay" by the D2D helper 930 is described in the following. In case that the user device D1 sends a packet to the user device D2, the source IP (internet protocol) address in the packet from the user device D1 is D1_ID and the target IP address is H_ID. When the D2D helper 930 receives this packet, the D2D helper 930 changes the source IP address into H_ID (i.e. the identification number of the D2D helper 930) and changes the target IP address into D2_ID. The D2D helper 930 sends the packet which is changed (the source IP address being changed into H_ID and the target IP address being changed into D2_ID) to the user device D2. Further, if there are two or more D2D helpers acting as the packet relay devices, the first D2D helper (which is close to the sender) changes the source IP address into H1_ID (i.e. the identification number of the first D2D helper) and changes the target IP address into H2_ID (i.e. the identification number of the second D2D helper), and the packet after change is sent to the second D2D helper (which is closer to the receiver). Other D2D helpers 930 process the packets in this way.

In the step S980, the D2D communication management device 950 sends a "link re-establishment command" and a "power adjustment command" (which includes the identification number D1_ID of the user device D1, the identification number D2_ID of the user device D2 and the identification number H_ID of the D2D helper 830) to the user devices D1-D2 and the D2D helper 930.

In the step S985, in response to the "link re-establishment command" and the "power adjustment command" from the D2D communication management device 950, the user devices D1-D2 and the D2D helper 930 perform D2D link re-establishment and power adjustment. That is, the D2D link (D1→D2) is re-established into the D2D link (D1→H) and D2D link (H→D2), and the D2D link (D2→D1) is re-established into the D2D link (D2→H) and D2D link (H→D1).

In the steps S990A and S990B, after link re-establishment, the user device D1 may perform D2D communication with the D2D helper 930 and the user device D2 may perform D2D communication with the D2D helper 930.

In one embodiment of the application, the steps S965-S990B may be details of the step S34 of FIG. 3.

Further, the wireless communication system 900 of FIG. 9 (wherein the D2D helper performs packet relay) does not include any power control device (that is, the power control function may be performed by the base station, and/or the D2D communication management device 950, and/or the user devices D1 and/or D2). However, in other possible embodiment of the application, when the D2D helper performs packet relay function, the wireless communication system may include any independent power control device, which is still within the spirit of the application.

Further, the steps of FIG. 8 and FIG. 9 may be combined with the steps of FIG. 3, which is still within the spirit of the application. For example, the steps S810A-S855 may be considered as preceding steps of step S31 of FIG. 3; and as described above, the steps S865-S890B and/or S965-S990B may be details of the step S34 of FIG. 3.

Figure 10:
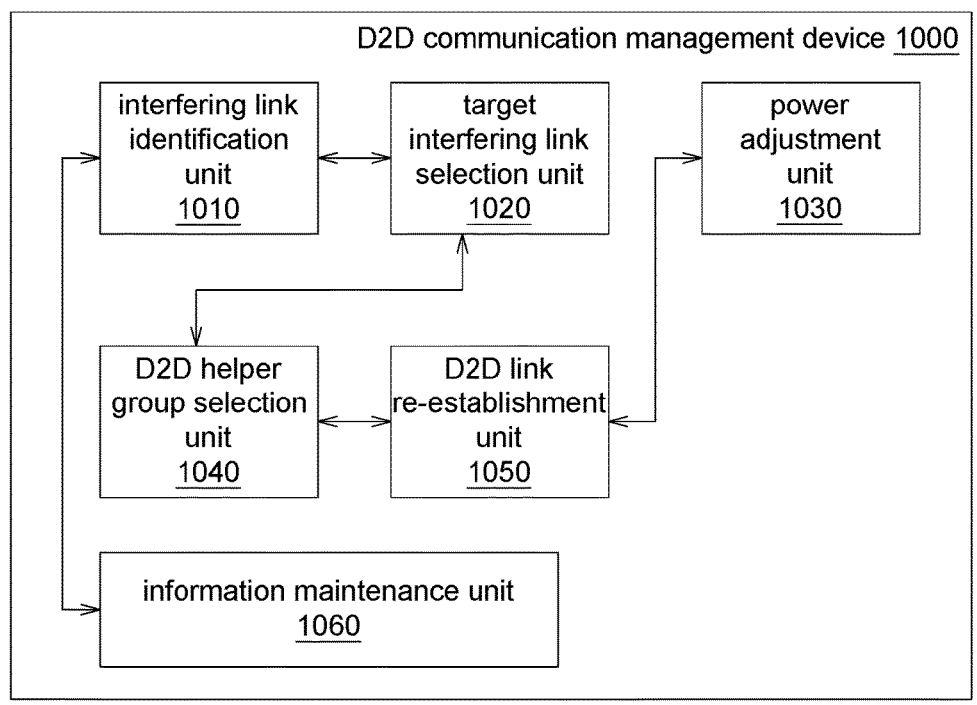
FIG. 10 shows a functional block diagram of a D2D communication management device according to an embodiment of the application.

FIG. 10 shows a functional block diagram of a D2D communication management device 1000 according to an embodiment of the application. The D2D communication management device 1000 includes: an interfering link identification unit 1010, a target interfering link selection unit 1020, a power adjustment unit 1030 (which is optional), a D2D helper group selection unit 1040, a D2D link re-establishment unit 1050 and an information maintenance unit 1060. The interfering link identification unit 1010, the target interfering link selection unit 1020, the power adjustment unit 1030 (which is optional), the D2D helper group selection unit 1040, the D2D link re-establishment unit 1050 and/or the information maintenance unit 1060 may be implemented by hardware or software. If the interfering link identification unit 1010, the target interfering link selection unit 1020, the power adjustment unit 1030 (which is optional), the D2D helper group selection unit 1040, the D2D link re-establishment unit 1050 and/or the information maintenance unit 1060 is implemented by hardware, then the interfering link identification unit 1010, the target interfering link selection unit 1020, the power adjustment unit 1030 (which is optional), the D2D helper group selection unit 1040, the D2D link re-establishment unit 1050 and/or the information maintenance unit 1060 may be implemented by independent or integrated circuit, chip or circuit board and coupled to each other. If the interfering link identification unit 1010, the target interfering link selection unit 1020, the power adjustment unit 1030 (which is optional), the D2D helper group selection unit 1040, the D2D link re-establishment unit 1050 and/or the information maintenance unit 1060 is implemented by software, then the interfering link identification unit 1010, the target interfering link selection unit 1020, the power adjustment unit 1030 (which is optional), the D2D helper group selection unit 1040, the D2D link re-establishment unit 1050 and/or the information maintenance unit 1060 may be implemented by program codes (which may be optionally stored in volatile or non-volatile memory device, such as, a memory, a hard-disk, a solid state drive (SSD)) that are executed by a processor.

The interfering link identification unit 1010 determines which one(s) of the D2D link is the interfering link(s), based on the location information of the sender and the receiver of the D2D communication and the channel quality information, and the details are described above.

The target interfering link selection unit 1020 selects at least one target interfering link from the interfering link(s) and the details are described above.

The power adjustment unit 1030 adjusts the transmission power of the user device and/or the D2D helper, and the details are described above.

The D2D helper group selection unit 1040 selects the target D2D helper group, and the details are described above.

The D2D link re-establishment unit 1050 re-establishes the target interfering link into multi-hop D2D links, and the details are described above.

The information maintenance unit 1060 maintains the respective location information of the respective sender of the on-going one or more D2D communication links, the respective location information of the respective receiver of the on-going one or more D2D communication links and the respective channel quality information of the on-going one or more D2D communication links.

In the above embodiments of the application, via distributing the D2D helpers, when the link interference exists, the D2D communication management device may select the D2D helper group and re-establish the long distance D2D link (having high interference) into multi-hop D2D links (each multi-hop D2D link having short distance and thus low interference), for lowering the interference on other D2D links.

The embodiments of the application may lower D2D communication interference by re-establishing the D2D link having long communication distance into multi-hop D2D links to narrow the interference range of the D2D link having long communication distance. Thus, by the embodiments of the application, the wireless communication system may allow more D2D links to communicate at the same time and to increase communication efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A wireless communication method comprising:
   determining at least one interfering link among a plurality of wireless communication links;
   finding at least one first wireless communication helper group of the at least one interfering link, the at least one first wireless communication helper group including at least one wireless communication helper;
   based on a respective interference improvement of the at least one first wireless communication helper group on the at least one interfering link, selecting at least one target interfering link from the at least one interfering link; and
   performing link re-establishment on the at least one target interfering link,
   wherein the step of determining the at least one interfering link includes:
      determining a plurality of interference amounts of the wireless communication links, each of the plurality of interference amounts of the wireless communication links is a number of other wireless communication links, among the wireless communication links, interfered by a respective one of the wireless communication links; and
      based on whether each of the plurality of interference amounts of the wireless communication links being higher than or equal to an interference amount threshold, determining whether each of the wireless communication links being the interfering link.

2. The method according to claim 1, wherein the step of determining the at least one interfering link includes:
   establishing a first directional link interference table to show the plurality of interference amounts of the wireless communication links;
   wherein the first directional link interference table is established based on respective location information of respective senders of the wireless communication links, respective location information of respective receivers of the wireless communication links or respective channel quality information of the wireless communication links.

3. The method according to claim 2, wherein the step of finding the at least one first wireless communication helper group of the at least one interfering link includes:
   based on a first transmission range of the interfering link and a second transmission range of a reverse link of the interfering link, selecting at least one wireless communication helper from a plurality of wireless communication helpers;

based on the selected wireless communication helper, the sender of the interfering link and the receiver of the interfering link, forming the at least one first wireless communication helper group;

based on the at least one first wireless communication helper group, establishing a second directional link interference table; and calculating a first interference improvement factor of the at least one first wireless communication helper group, wherein the first interference improvement factor is related to a first link-interference-free ratio and a second link-interference-free ratio, the first link-interference-free ratio is related to a first ratio of a number of interfere-free wireless communication links of the wireless communication links and to a number of all other wireless communication links of the wireless communication links; and the second link-interference-free ratio is related to a second ratio of a number of interfere-free wireless communication links of the wireless communication links to a number of all other wireless communication links of the wireless communication links, after the at least one first wireless communication helper group is considered.

4. The method according to claim 3, wherein the step of selecting the at least one target interfering link includes:

selecting, from the at least one first wireless communication helper group of the at least one interfering link, a first target wireless communication helper group having a first maximum interference improvement factor;

based on the first target wireless communication helper group, selecting the at least one target interfering link and a reverse wireless communication link thereof; and selecting, from at least one second wireless communication helper group of the reverse wireless communication link, a second target wireless communication helper group having a second maximum interference improvement factor.

5. The method according to claim 4, wherein:

when among the at least first wireless communication helper group, at the same, there are two or more wireless communication helper group having substantially the first maximum interference improvement factor, selecting the first target wireless communication helper group based on a number of the wireless communication helper.

6. The method according to claim 4, wherein when the at least first wireless communication helper group includes a plurality of wireless communication helpers, the selected wireless communication helpers are directionally arranged based on a link direction, the link direction being from the sender of the interfering link to the receiver of the interfering link.

7. The method according to claim 4, wherein:

based on a total signal transmission distance between the sender of the interfering link, the selected at least one wireless communication helper and the receiver of the interfering link, forming the at least one first wireless communication helper group.

8. The method according to claim 4, wherein the step of performing link re-establishment on the at least one target interfering link includes:

re-establishing the at least one target interfering link based on the first target wireless communication helper group; and re-establishing the reverse wireless communication link of the at least one target interfering link based on the second target wireless communication helper group.

9. The method according to claim 8, wherein the step of performing link re-establishment on the at least one target interfering link includes:

re-establishing the at least one target interfering link into a first multi-hop wireless communication link and a second multi-hop wireless communication link, wherein the first multi-hop wireless communication link is based on the sender and the first target wireless communication helper group, and the second multi-hop wireless communication link is based on the first target wireless communication helper group and the receiver.

10. A wireless communication management system including:

at least two user devices forming a first wireless communication link;

at least one wireless communication helper; and a communication management device wireless coupled to the at least two user devices and the at least one wireless communication helper, wherein the communication management device determines whether the first wireless communication link is an interfering link by determining whether an interference amount of the first wireless communication link is higher than or equal to an interference amount threshold, and the interference amount of the first wireless communication link is a number of other wireless communication links interfered by the first wireless communication link;

when the communication management device determines the first wireless communication link is the interfering link, the communication management device determines whether the at least one wireless communication helper is useful in improving interference of the interfering link;

when the communication management device determines the at least one wireless communication helper is useful in improving interference of the interfering link, the communication management device commands to re-establish the first wireless communication link between the at least two user devices to form multi-hop links between the at least two user devices and the at least one wireless communication helper.

11. The wireless communication system according to claim 10, wherein the at least two user devices send a wireless communication acknowledgement, respective location information or channel quality information to the communication management device; and based on channel quality information of a second wireless communication link, the communication management device determines whether the first wireless communication link interferes on the second wireless communication link.

12. The wireless communication system according to claim 10, further including a power control device wireless coupled to the communication management device, the at least two user devices and the at least one wireless communication helper, wherein
the communication management device sends a signal relay trigger signal to the at least one wireless communication helper;
the at least one wireless communication helper performs signal relay;
the communication management device sends a power adjust command to the power control device, the power adjust command including respective identification number of the at least two user devices and the at least one wireless communication helper; and
the power control device adjusts respective power of the at least two user devices and the at least one wireless communication helper.

13. The wireless communication system according to claim 10, wherein
the communication management device sends a packet relay trigger signal to the at least one wireless communication helper;
the at least one wireless communication helper performs packet relay;
the communication management device sends a link re-establishment command and a power adjust command to the at least two user devices and the at least one wireless communication helper, the power adjust command including respective identification number of the at least two user devices and the at least one wireless communication helper; and
in response to the link re-establishment command and the power adjust command from the communication management device,
the at least two user devices and the at least one wireless communication helper perform link re-establishment and power adjustment.

14. A wireless communication management device including:
an interfering link identification unit being configured for determining at least one interfering link among a plurality of wireless communication links;
a wireless communication helper group selection unit being configured for finding at least one first wireless communication helper group of the at least one interfering link, the at least one first wireless communication helper group including at least one wireless communication helper;
a target interfering link selection unit being configured for, based on a respective interference improvement of the at least one first wireless communication helper group on the at least one interfering link, selecting at least one target interfering link from the at least one interfering link; and
a wireless communication link re-establishment unit being configured for performing link re-establishment on the at least one target interfering link,
wherein the interfering link identification unit is configured for:
determining a plurality of interference amounts of the wireless communication links, each of the plurality of interference amounts of the wireless communication links is a number of other wireless communication links, among the wireless communication links, interfered by a respective one of the wireless communication links; and
based on whether each of the plurality of interference amounts of the wireless communication links being higher than or equal to an interference amount threshold, determining whether each of the wireless communication links being the interfering link.

15. The wireless communication management device according to claim 14, wherein the interfering link identification unit is configured for:
establishing a first directional link interference table to show the plurality of interference amounts of the wireless communication links;
wherein the first directional link interference table is established based on respective location information of respective senders of the wireless communication links, respective location information of respective receivers of the wireless communication links or respective channel quality information of the wireless communication links.

16. The wireless communication management device according to claim 15, wherein the wireless communication helper group selection unit is configured for:
based on a first transmission range of the interfering link and a second transmission range of a reverse link of the interfering link, selecting at least one wireless communication helper from a plurality of wireless communication helpers;
based on the selected wireless communication helper, the sender of the interfering link and the receiver of the interfering link, forming the at least one first wireless communication helper group;
based on the at least one first wireless communication helper group, establishing a second directional link interference table; and
calculating a first interference improvement factor of the at least one first wireless communication helper group,
wherein the first interference improvement factor is related to a first link-interference-free ratio and a second link-interference-free ratio,
the first link-interference-free ratio is related to a first ratio of a number of interfere-free wireless communication links of the wireless communication links to a number of all other wireless communication links of the wireless communication links; and
the second link-interference-free ratio is related to a second ratio of a number of interfere-free wireless communication links of the wireless communication links to a number of all other wireless communication links of the wireless communication links, after the at least one first wireless communication helper group is considered.

17. The wireless communication management device according to claim 16, wherein the target interfering link selection unit is configured for:
selecting, from the at least one first wireless communication helper group of the at least one interfering link, a first target wireless communication helper group having a first maximum interference improvement factor;
based on the first target wireless communication helper group, selecting the at least one target interfering link and a reverse wireless communication link thereof; and
selecting, from at least one second wireless communication helper group of the reverse wireless communication link, a second target wireless communication helper group having a second maximum interference improvement factor.

18. The wireless communication management device according to claim 17, wherein:
when among the at least first wireless communication helper group, at the same, there are two or more wireless communication helper group having substantially the first maximum interference improvement factor, the wireless communication helper group selection unit is configured for selecting the first target wireless communication helper group based on a number of the wireless communication helper.

19. The wireless communication management device according to claim 17, wherein when the at least first wireless communication helper group selected by the wireless communication helper group selection unit includes a plurality of wireless communication helpers, the selected wireless communication helpers are directionally arranged based on a link direction, the link direction being from the sender of the interfering link to the receiver of the interfering link.

20. The wireless communication management device according to claim 17, wherein:
based on a total signal transmission distance between the sender of the interfering link, the selected at least one wireless communication helper and the receiver of the interfering link, the wireless communication helper group selection unit is configured for forming the at least one first wireless communication helper group.

21. The wireless communication management device according to claim 17, wherein the wireless communication link re-establishment unit is configured for:
re-establishing the at least one target interfering link based on the first target wireless communication helper group; and
re-establishing the reverse wireless communication link of the at least one target interfering link based on the second target wireless communication helper group.

22. The wireless communication management device according to claim 21, wherein the wireless communication link re-establishment unit is configured for:
re-establishing the at least one target interfering link into a first multi-hop wireless communication link and a second multi-hop wireless communication link, wherein the first multi-hop wireless communication link is based on the sender and the first target wireless communication helper group, and the second multi-hop wireless communication link is based on the first target wireless communication helper group and the receiver.

23. The wireless communication management device according to claim 14, further comprising:
an information maintenance unit being configured for maintaining respective location information of respective senders of the wireless communication links, respective location information of respective receivers of the wireless communication links and respective channel quality information of the wireless communication links.

24. The wireless communication management device according to claim 17, further comprising:
a power control unit being configured for sending a power adjusting command to respective sender of the at least one target interfering link, to respective receiver of the at least one target interfering link and to a first target wireless communication helper group, the power adjusting command including respective identification number of the respective sender of the at least one target interfering link, respective identification number of the respective receiver of the at least one target interfering link and respective identification number of the first target wireless communication helper group.

* * * * *